Sept. 19, 1967  E. T. IHLENFELDT  3,343,072
FUNCTION GENERATOR
Filed Nov. 4, 1964  2 Sheets-Sheet 1
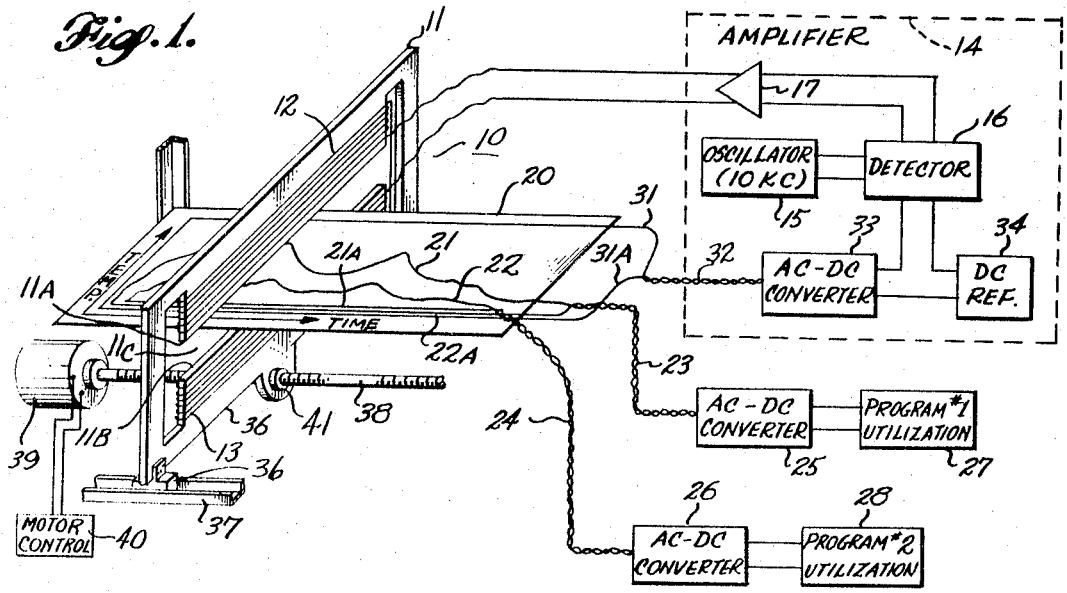
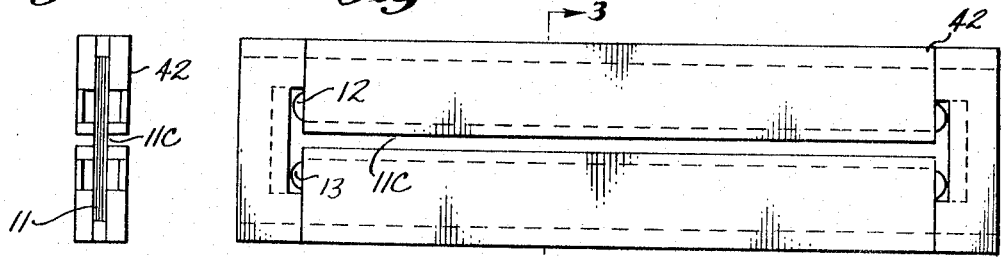
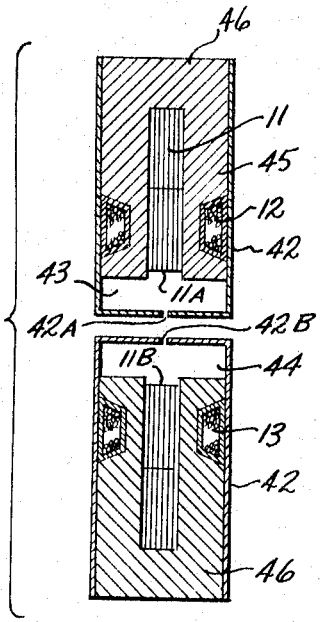
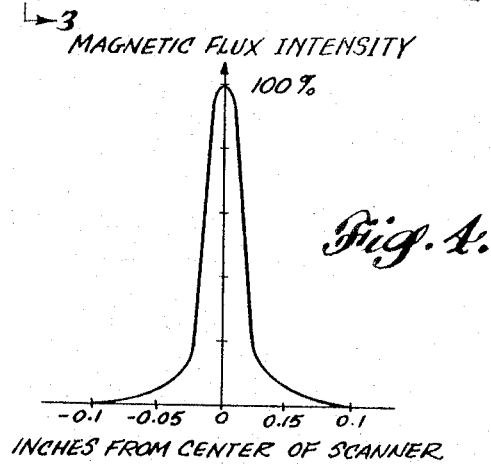
INVENTOR.
EUGENE T. IHLENFELDT
BY
Orland M. Christensen
ATTORNEY INVENTOR.
EUGENE T. IHLENFELDT
BY Orland M. Christensen
ATTORNEY United States Patent Office 3,343,072
Patented Sept. 19, 1967

3,343,072
FUNCTION GENERATOR
Eugene T. Ihlenfeldt, Kirkland, Wash., assignor to The Boeing Company, Seattle, Wash., a corporation of Delaware
Filed Nov. 4, 1964, Ser. No. 408,928
19 Claims. (Cl. 323—44)

The present invention relates to function generators and more particularly to an improved and simplified function generator for providing single or multi-channel electrical signals representative of the relationship between two selected parameters.

Various types of function generators are known at the present time and find extensive use in various programming and control systems. It is common practice to utilize a function generator for providing electrical signals which vary in a manner which is proportional to a preselected variation in the relationship between two interdependent parameters. For example, in the control of temperature systems it is desirable and often necessary to preprogram for a specified interval of time the relationship of temperature versus time. One such example of the use of temperature versus time programming is in the control of high temperature ovens used for conducting tests on various types of materials and wherein it is necessary to be able to have the oven assume a preselected temperature at a given time, remain at that temperature for a given time interval, and then thereafter change to another temperature for a different time interval.

One type of function generator commonly used for generating electrical control signals for use in controlling devices such as high temperature ovens makes use of a servo-type curve-follower which is adapted to follow a preplotted curve of a desired temperature verses time characteristic. As the curve-follower follows the selected curve electrical signals are generated which are proportional to the position of the follower device. Such signals are then used to control any other desired equipment and also to operate one or more servo-systems for causing the device to continue to track the curve. Generally such servo-type function generators are relatively slow since they depend upon a continuously controlled drive system for causing an element to track a given curve. It has been found that with many presently available devices of this type system oscillation occurs. A further drawback of servo-type function generators is that only one independent program or channel is obtained from each curve-follower or curve-reproducer and therefore if a plurality of functions are to be simultaneously generated a plurality of the function generators is required.

It is therefore an object of the present invention to provide an improved function generator.

It is another object of the present invention to provide an improved multi-channel function generator.

Another object of the present invention is to provide a simplified multi-channel function generator which does not depend upon mechanical or electromechanical servo-controlled curve-following devices for generating the desired function signals.

An additional object of the present invention is to provide an improved and simplified function generator which eliminates oscillation problems heretofore encountered in servo-type systems.

Another object of the present invention is to provide an improved and simplified multi-channel function generator having a rapid response time and which is capable of producing a plurality of independent programs simultaneously without the need for extensive duplication of equipment.

In accordance with the teachings of the present invention, the desired relationship between two variables, as for example temperature versus time, is outlined on a nonconductive card using small gauge insulated wire taped or cemented in place on the card. The wire is positioned with reference to two perpendicular axes on the card which correspond to the abscissa and ordinate of a two dimension coordinate system. The wire has one section shaped in the form of a curve representing the desired relationship between time and temperature and another section parallel to a coordinate axis. The desired relationship between the two quantities can also be "drawn" or outlined on the non-conductive card in other ways as, for example, by the use of printed circuit or other techniques. The system does not rely for its operation on a curve-follower and associated servo-systems, and therefore a plurality of functions can be simultaneously generated. To this end each individual conductive curve representing the desired relationship between temperature and time, or between other selected parameters, is insulated so that a plurality of the conductive curves can be carried on a single card. The various curves can thus cross each other without affecting the system operation. Each curve includes a return wire parallel to a base line so that a closed circuit is provided for transmitting output signals to any desired program utilization device in the manner described below.

Magnetic field generating means is provided for establishing a thin line of flux transverse to the plane of the card carrying the above described curves and with the line extending perpendicular to the above referred to base line. In one preferred embodiment the magnetic field generating means is in the form of a scanner which includes a pair of elongated cores and associated coils which define an opening for permitting relative movement between the scanner and the program card. The magnetic scanner is provided with an alternating electric signal so that a varying magnetic field restricted to a thin line perpendicular to the base line of the program card is provided. In one preferred arrangement the electric signal varies at a rate in the audio frequency range. The arrangement is such that when relative movement takes place between the program scanner and the program card each of the conductive curves on the card will have an AC signal generated therein which is proportional to the flux enclosed by the loop associated with that curve, which in turn is directly proportional to the ordinate of the curve at its intersection with the line of flux generated by the scanner. The voltage signal generated in each individual loop on the card is applied to an amplifier and an AC to DC converter so that a DC signal is provided which is proportional to the ordinate of the associated curve at each instant in time as the scanner is moved along the program card. In the embodiment of the invention shown herein the program card is stationary and the scanner is moved with respect thereto, but it will be obvious to those skilled in the art that modifications, such as for example having the scanner stationary and the card moving, can be made.

The above additional advantages and objects of the present invention will be more clearly understood from the following description when read with reference to the accompanying drawings and wherein, FIGURE 1 is a diagrammatic illustration of the various components in one preferred embodiment of the invention with part of the elements being shown in an isometric view to most clearly illustrate the manner of operation thereof, and with other parts being shown in the form of a circuit diagram in block form;

FIGURE 2 is a side view of a preferred magnetic scanner adapted for use in the system of FIGURE 1;

FIGURE 2A is an end view of the magnetic scanner shown in FIGURE 2;

FIGURE 3 is an enlarged cross-sectional view along the lines 3—3 of the magnetic scanner shown in FIGURE 2;

FIGURE 4 is a graph of magnetic flux intensity versus distance from the center of the scanner shown in FIGURES 2 and 3;

Figure 5:
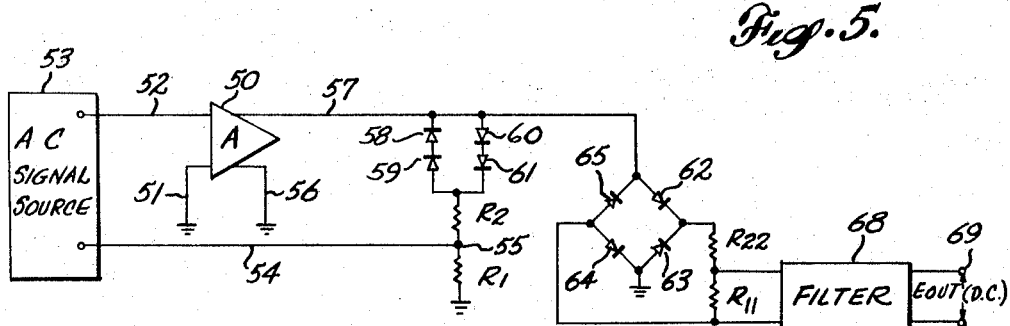
FIGURE 5 is a generalized circuit diagram of a preferred low level AC to DC converter advantageously utilized with the system of FIGURE 1.

Referring now to the drawings and in particular to FIGURE 1, there is shown a magnetic scanner 10 which includes a magnetic core 11 having diametrically opposed parallel pole pieces 11A and 11B which define a longitudinal opening 11C therebetween. A pair of electrical wire windings 12 and 13 are connected in series circuit and are respectively wound on the pole pieces 11A and 11B so that when the windings 12 and 13 are energized with an alternating current electrical signal an alternating magnetic field in the shape of a uniform thin line will be provided in the opening 11C. The magnetic scanner is shown in FIGURE 1 without shielding in order to teach most clearly the general concepts of the present invention. As described in detail hereinafter by reference to FIGURES 2 and 3 the scanner is advantageously provided with appropriate shielding and is so constructed that a very thin elongated line of magnetic flux between the pole pieces 11A and 11B will be generated with the lines of flux extending from one pole piece to the other.

The windings 12 and 13 are connected to a signal generation and control system 14 shown generally within the dashed lines and including audio frequency oscillator 15 connected to a detector 16 which is in turn connected to an amplifier 17 having its signal output circuit connected directly to the windings 12 and 13. The arrangement is such that the windings 12 and 13 are provided with AC signals having an amplitude which is controlled in the manner described hereinafter.

The function generator of FIGURE 1 includes a thin sheet or card 20 of a suitable nonconductive material such as Teflon positioned in the opening 11C and perpendicular to the lines of flux produced by the scanner. Disposed on the surface of the card 20 are a plurality of program conductors in the general outline of the desired relationship between two quantities. For purpose of illustration the program card in FIGURE 1 includes two program conductors 21 and 22, but in practice many more conductors can be used on a single card. For purposes of teaching the present invention the system of FIGURE 1 will be described as providing output program signals indicating a desired relationship between temperature and time. Therefore each of the program conductors 21 and 22 is positioned on the card 20 in a different pattern corresponding to two separate desired relationships between temperature and time. In the system of FIGURE 1 temperature is represented by the ordinate or Y axis and time along the abscissa or X axis if the card is considered as having the system of coordinates labeled thereon in FIGURE 1. The conductors 21 and 22 may be in the form of small diameter enameled copper wires adhered to the surface of the card 20 by an adhesive or by an insulating tape. The conductors can also be provided by means of printed circuit or other techniques well known at the present time for providing conductors in a prearranged pattern on an insulating medium. The arrangement is such that each of the program wires is insulated from all other program wires and therefore a large number of program wires for separate desired temperature versus time programs can be applied to a single card 20. The system operates in a manner such that the various program wires can cross each other without affecting system operation. In the illustration of FIGURE 1 the two program conductors 21 and 22 are illustrated as being on the same side of the card 20, but in practice both sides can be used to carry the program wires. Each of the program wires 21 and 22 has a straight section 21A and 22A, respectively, which runs parallel to the bottom edge (X or time axis) of the card 20. Thus each of the conductors 21 and 22 together with its associated return section 21A and 22A forms a loop which is enclosed by the straight line of the scanner opening 11C. The conductors 21 and 22 with their return sections 21A and 22A are formed as twisted pairs 23 and 24 going to the associated AC to DC converters 25 and 26. Each of the converters 25 and 26 is adapted to provide an output direct current signal to an associated program utilization device 27 and 28. While the program utilization devices can be any of a number of devices, in the system shown for purpose of illustration in FIGURE 1 the program utilization devices are high temperature ovens adapted to undergo selected programs of temperature versus time as determined by the curves formed by the wires 21 and 22.

As described hereinafter, reference signals for controlling the level of excitation voltage applied to the scanner windings 12 and 13 are generated in a reference signal loop formed by the wire 31 which extends along and parallel to the rear edge of the card 20, down and parallel to the left edge of the card 20, and then back to the right as wire 21A parallel to the bottom edge of the card 20. The sections of wire 31 and 31A form the twisted pair indicated at 32 as being connected to a third AC to DC converter 33. A DC reference source 34 is connected to the AC to DC converter 33 and also to the detector 16, as is the converter 33. The detector 16 compares the level of the signal provided by the converter 33 with the DC signal provided by the DC reference source 34 and controls the amplifier 17 in accordance therewith so that the level of the flux in the opening 11C remains constant at a selected level during system operation.

In the system of FIGURE 1 relative movement is produced between the magnetic scanner 10 and the program card 20 so that each program conductor 21 and 22 is scanned along its entire length. The rate of relative movement between the scanner and the card may preferably be made constant, or may be made to vary in any selected manner. The magnetic scanner 10 is thus carried by brackets 36 (one of which is shown) supported by guide members 37 (one of which is shown) in a manner such that the scranner 10 can move with respect to the program card 20 and in a manner such that the card 20 remains centered in the opening 11C. A threaded shaft 38 driven by an electric motor 39 engages a member 41 carried by the scanner so that as the shaft 38 rotates the scanner 10 is translated. A motor control device 40 serves to control the rate at which the magnetic scanner 10 is moved with respect to the card 20 and therefore establishes the time base for the system.

From the above it will be seen that each of the program conductors 21 and 22 as well as the reference conductor 31 forms a conductive loop which is intersected by the moving line of flux. In the case of the reference conductor 31 the flux enclosed thereby remains constant whereas the flux enclosed by the program conductors 21 and 22 varies in accordance with the ordinate of the conductor at each instant. Therefore as the scanner 10 moves along the card 20 each of the program conductors as well as the reference conductor 31 will have an alternating current signal induced therein by the alternating magnetic field, with the instantaneous amplitude of such signals being proportional to the flux enclosed by the loop of conductive material. Since this is directly proportional to the ordinate of the conductor at its intersection with the line of flux it will be seen that each of the program utilization devices 27 and 28 is provided with a DC signal having an amplitude which varies in accordance with the desired variation in temperature with respect to time. Each of the program utilization devices makes use of such program signals to control the heating elements in a high temperature oven in a manner known in the art. The wire 31 and its return section 31A are maintained parallel to each other (as well as to the X axis) and therefore the signal provided to converter 33 remains at a substantially constant level. The detector 16 and reference source 34 serve to improve the system operation by causing automatic adjustment of the amplifier 17 to further maintain the level of flux constant throughout the range of operation on card 20. Thus it will be seen that a simplified and low cost multi-channel function generator is provided for simultaneously generating a plurality of electrical program signals proportional to desired relationships between two quantities such as time and temperature.

As described with reference to FIGURE 1, it is desirable for enhanced system operation to have the magnetic scanner generate a very thin line of magnetic flux. In FIGURES 2 and 3 there is shown in greater detail the construction details of a preferred embodiment of the magnetic scanner and including the associated shielding. Referring now to FIGURES 2 and 3, it will be seen that the magnetic core 11 is made from a plurality of thin plates of magnetic material such as the sheets commonly used in audio transformers, the sheets being laminated together. The core 11 is positioned in openings provided in an aluminum frame 46 with the coils 12 and 13 wound around the magnetic core within slots machined in the aluminum frame 46. The entire assembly is disposed within a one-piece container 42 formed of copper. While other materials can be used, it is found in practice that the use of aluminum for the frame 46 simplifies machining of the frame, while the use of a single piece of copper having low resistivity for the container provides desirable shielding characteristics. The slots for the windings 12 and 13 are preferably lined with a suitable insulating material to protect the wires during construction of the scanner. As seen most clearly in the cross section of FIGURE 3, air spaces 43 and 44 are provided between the ends of the pole pieces 11A and 11B and the copper shield 42 to minimize spread of the flux. The opening 11C is defined by the sections of copper shield 42 opposite the ends of pole pieces 11A and 11B. A pair of thin longitudinal slots 42A and 42B extend for the length of the copper shield 42 to thereby define the exit opening for the magnetic flux. The slots 42A and 42B are aligned with the central longitudinal axes of the pole pieces 11A and 11B.

In FIGURE 4 there is shown a graph of magnetic flux intensity versus distance from the center slots 42A and 42B of the scanner shown in FIGURES 2 and 3. The flux pattern shown in FIGURE 4 was obtained by using slots 42A and 42B of approximately 1/64 of an inch across and with approximately 200 turns on the windings 12 and 13. It will be seen in FIGURE 4 that a symmetrical and very thin line of magnetic flux is provided by the scanner assembly of FIGURES 2 and 3. Thus a high resolution system is provided.

Figure 7:
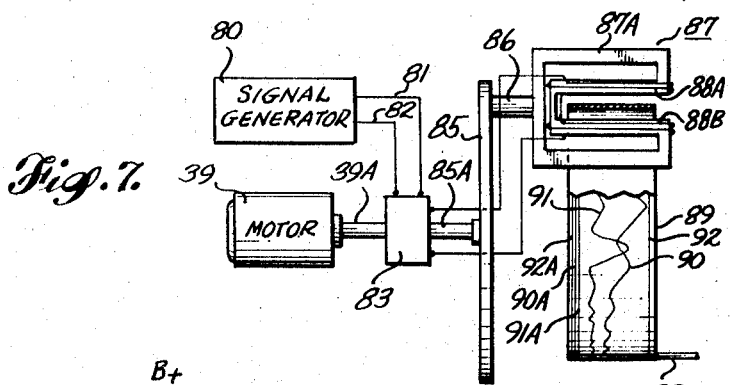
FIGURE 7 is a diagrammatic illustration of an embodiment of the invention similar to that of FIGURE 1 but wherein the program card is cylindrical and the scanner moves in a manner to provide uninterrupted repeating programs.

Referring now to FIGURE 7 there is shown an embodiment of the present invention which is similar to that shown in FIGURE 1 but wherein the program device is in the form of a thin-walled cylindrical program member 89 made of an insulating material and having insulated program wires 90 and 91 secured thereto. A reference signal wire 92 is similarly secured to the member 89 and is positioned along a circumference of the member 89. Each wire 90, 91 and 92 extends around the member 89 and has a return section 90A, 91A, 92A, respectively, so that each forms a U-shaped loop analogous to the arrangement of the wires shown in FIGURE 1. The wires 90, 91 and 92 together with their return sections 90A, 91A, and 92A are formed as twisted pairs in the cable 93 extending to the right from the bottom of the program member 89 and are connected to utilization devices in the manner shown in FIGURE 1. In practice the cylindrical program member 89 and associated program wires thereon can be formed by rolling the program card 20 of FIGURE 1 into the desired configuration. For purposes of showing further advantages of the present invention the program conductors 90 and 91 in FIGURE 7 are illustrated as crossing each other.

In the embodiment of FIGURE 7 an AC signal generating apparatus 80 is connected by leads 81 and 82 to a brush assembly 83 associated with a shaft 85A secured to the disk 85. A motor 39 has its shaft 39A coupled with shaft 85A for selectively rotating the disk 85. The disk 85 has a supporting stud 86 to which a magnetic scanner 87 (similar to the scanner 10 of FIGURE 1) is attached. The scanner is shown diagrammatically as including a core 87A and serially connected windings 88A and 88B. The windings 88A and 88B are connected through the brush assembly 83 to the signal generator 80. The arrangement is such that the axis of rotation of the disk 85 coincides with the center of the cylinder defined by program member 89 with the scanner 87 providing an alternating field of magnetic flux which passes through the member 89, said flux being restricted to a narrow line extending perpendicular to the sections of wire 90A, 91A, and 92A. The operation of the system of FIGURE 7 corresponds in general to the operation of the system of FIGURE 1 in that when the scanner 87 is energized by an AC signal and is moved with respect to the program conductors 90 and 91, the desired program signals will be generated in the program conductors. The amplitude of such signals will be proportional to flux enclosed by each loop at a given instant of time, which is in turn proportional to the separation between the respective wires 90 and 91 and their associated return sections 90A and 91A. The voltage signal induced in wire 92 serves as a reference signal which may be used for control and adjustment purposes as described in FIGURE 1.

From the above it will be seen that the embodiment of the invention in FIGURE 7 is adapted to provide a plurality of continuously repeating individual program signals in response to energization and rotation of the scanner 87 with respect to the program wires formed in the outline of the desired relationship between two quantities such as time and temperature.

Various types of AC to DC converters have been built and used in the art and such are suitable for use with the system of FIGURE 1. To further improve the operation of the system the AC to DC converter shown generally in FIGURE 5, and in greater detail in FIGURE 6 can be used to reduce or eliminate the effects of nonlinearities of many commercially available converters. The improved converter shown generally in FIGURE 5 includes a high gain amplifier 50 having a grounded signal input terminal 51 as well as a signal input terminal 52 to which an AC signal source 53 is connected. The other terminal of the AC signal source 53 is connected by the lead 54 to a point 55 which is intermediate resistors R2 and R1 with R1 being grounded. The high gain amplifier 50 has one of its signal output leads 56 connected to ground and the other lead 57 thereof connected through the diodes 58–61 to the resistor R2. It will be seen that the diodes 58 and 59 are connected in series circuit for the flow of current in one direction through resistor R2 while diodes 60 and 61 are connected in series circuit for the flow of current in the opposite direction through resistor R2.

A full wave rectifier circuit including the diodes 62–65 is connected in series circuit with resistors R11 and R22 across the output of the amplifier 50. It should be noted that the branch containing the resistors R11 and R22 is substantially identical to the branch containing the resistors R1 and R2 in terms of the effect of diodes in the circuits. That is, at any given time two of the diodes 62–65 and the two resistors R11 and R22 are connected in series circuit across the output of the amplifier 50, as are the resistors R1 and R2 and two of the diodes 58–61. Each of the eight diodes shown in FIGURE 5 are of the same solid state type and have substantially identical characteristics. When the gain of the amplifier 50 is relatively high the voltage drop across resistor R1 is for all practical purposes equal to the input signal provided by the AC signal source 53. Therefore the voltage drop across the series combination of resistors R1 and R2 is equal to $$\frac{R1+R2}{R1} E_{input}$$

Since the branch containing resistors R11 and R22 is substantially identical to the branch containing resistors R1 and R2 except that unidirectional current flow takes place in the branch containing resistors R11 and R22 an accurate AC to DC converter is provided. A filter 68 may be connected across the resistor R11 for filtering the DC output signal provided between the signal output terminals 69 and 70. If isolation from signal ground is required a high quality isolation transformer can be inserted between the branch containing R1 and R2 and the branch containing R11 and R22. Isolation can similarly be achieved for isolating the input from ground by using an isolation transformer in the input.

Figure 6:
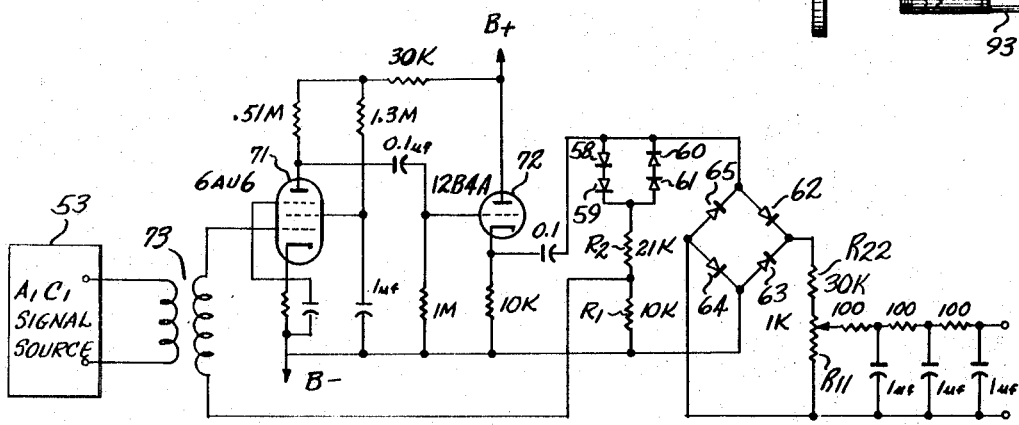
FIGURE 6 is a schematic circuit diagram showing in greater detail one specific AC to DC converter system adapted for use in the system of FIGURE 1.

FIGURE 6 includes the construction details of one converter constructed in accordance with the generalized diagram of FIGURE 5 and found to work well in the systems of the present invention. In FIGURE 6 those components corresponding to like components in FIGURE 5 bear the same reference numerals. It will be seen that the resistor R11 is in the form of a variable resistor to permit system calibration. The high gain amplifier includes two stages provided by the pentode 71 which receives input signals from the AC signal source through an input transformer 73 and the triode 72. The two stages operate as a high gain amplifier with appropriate negative feedback from the output circuit to compensate for diode nonlinearities. Using the parameter values shown for purpose of illustration in FIGURE 6, better than 0.5% linearity in converting low level (zero to 2 millivolt) AC signals to DC signals is achieved.

While the invention has been described with reference to program of time versus temperature it should be understood that the same was done only for purpose of illustration, and that the system is well suited for programs involving loads, tension, compression, strain, altitude and various other parameters, and particularly for programming combined test parameters such as temperature and altitude or other combinations. The system has been found to have a rapid response time with one specific system having had response time of approximately 1 millisecond when the oscillator 15 of FIGURE 1 was operated at a frequency of 10 kc. It is found in practice that the system response to a step function program is limited primarily only by the shape of the scanning field.

There has thus been disclosed an improved function generator which is adapted to provide a plurality of electric signal programs each of which corresponds to any desired and predetermined relationship between selected parameters and without the drawbacks of overshoot and equipment duplication heretofore encountered in the art. While the invention has been disclosed by reference to specific preferred embodiments, it is to be understood that those changes and modifications which will become obvious to a person skilled in the art from the teachings hereof are to be encompassed by the following claims:

What is claimed is:

1. A function generator comprising in combination: a conductor having a first substantially straight section and a second section coplanar with said first section and displaced at all points from said first section by a distance representative of a desired relationship between a first parameter and a second parameter; magnetic field generating means establishing an alternating magnetic field having components of flux intersecting each of said sections of conductor; means producing relative movement between said magnetic field generating means and said conductor; and signal output means coupled with said conductor.

2. A function generator in accordance with claim 1 wherein said magnetic flux generating means includes a pair of parallel elongated pole pieces disposed on opposite sides of the plane containing said conductor, winding means disposed about said pole pieces, and alternating current means coupled with said winding means.

3. A function generator in accordance with claim 1 and including a sheet of nonconductive material having said conductor disposed thereon.

4. A function generator as defined in claim 3 and including a second conductor disposed on said sheet of nonconductive material and having a first substantially straight section parallel to said first section of said first conductor and a second section displaced from its said first section by a second distance proportional to a desired relationship between third and fourth parameters.

5. A function generator comprising in combination: magnetic field means establishing a substantially straight line pattern of alternating magnetic flux with the lines of flux substantially perpendicular to said straight line pattern; a loop of conductive material disposed in said alternating flux having first and second sections arranged with the separation between said first and second sections in a direction parallel to said line pattern being proportional to a desired relationship between two parameters; and means producing relative movement between said magnetic field means and said loop of conductive material, whereby a voltage signal is induced in said loop of conductive material having an amplitude proportional to said separation between said first and second sections.

6. A function generator in accordance with claim 5 and including a second loop of conductive material having first and second sections each parallel to said first section of said first loop of material and disposed within said pattern of magnetic flux, whereby a susbtantially constant amplitude reference signal is generated in said second loop of conductive material.

7. A function generator in accordance with claim 6 and including control means coupled with said magnetic field means and with said second loop of conductive material and responsive to said reference signal to control the intensity of the magnetic flux provided by said field means.

8. A function generator in accordance with claim 7 wherein said magnetic field means includes first and second elongated magnetic pole pieces each parallel to said straight line pattern and displaced from each other to define a first opening with said lines of flux extending between said pole pieces through said first opening, and including means supporting said loops of conductive material with a portion of each of said sections thereof disposed within said opening.

9. A function generator in accordance with claim 7 and including a nonconductive program member having said loops of conductive material secured thereto.

10. A function generator in accordance with claim 9 wherein said member is cylindrical, and wherein said first section of said first loop extends around a circumference of said cylindrical member.

11. An electric signal function generator for providing an electric signal having an amplitude which varies in accordance with a predetermined variation in the relationship between first and second parameters, comprising in combination: a nonconductive program member; a first conductive wire secured to said member and having a first section arranged in a first line extending in a substantially constant direction thereon and a second section arranged in a pattern on said member such that the distance between said first and second sections varies in accordance with said predetermined variation in the relationship between said first and second parameters; magnetic field means establishing an alternating magnetic field with lines of flux passing through said member and with said magnetic field being restricted substantially to a straight line perpendicular to said constant direction; and means coupled with said magnetic field means adapted to move said field means along said member in said constant direction, whereby an electric signal having an amplitude proportional to the distance between said sections is induced in said wire.

12. A function generator as defined in claim 11 wherein said member is in the shape of a right circular cylinder and said first section extends parallel to the circumference thereof.

13. A function generator in accordance with claim 11 and including a second wire disposed on said member and having first and second sections each parallel to said first section of said first wire.

14. A function generator in accordance with claim 13 and including magnetic field intensity control means coupled with said second wire and with said magnetic field means and responsive to signals induced in said second wire to control the intensity of said field.

15. A function generator in accordance with claim 14 wherein said magnetic field means includes first and second parallel elongated pole pieces disposed on opposite sides of said member and each having a current carrying winding thereon, alternating current means coupled with said windings for providing alternating current signals thereto; and wherein said control means includes a source of reference potential, and detector means coupled with said source of potential and with said second wire adapted to provide a signal proportional to any difference between said reference potential and the signal induced in said second wire.

16. A function generator comprising in combination: a function program member; electrically conductive means secured to said member defining a loop having a first section defining a first coordinate axis and a second section having each portion thereof displaced from said axis by a predetermined distance such that said second section forms a conductive line graph of a desired relationship between two variables which are respectively represented along said first axis and along a second axis perpendicular to said first axis; a magnetic scanner establishing an alternating magnetic field with lines of flux passing through said member and defining a thin-line substantially perpendicular to said first axis crossing a portion of each of said two sections of said conductor; drive means coupled with said scanner operative to move said scanner parallel to said first axis; and signal output circuit means coupled with said conductive means.

17. A function generator in accordance with claim 16 wherein said magnetic scanner includes first and second elongated pole pieces disposed on opposite sides of said program member and each having a substantially rectangular pole face aligned perpendicular to said first axis and parallel to the surface of said program member; first and second electrical windings disposed respectively about said pole pieces; and shielding means disposed about said pole pieces and including first and second sheets of metal disposed respectively between said first pole face and said program member and between said second pole face and said program member, each of said sheets of metal having a thin longitudinal opening therein to permit passage of magnetic flux therethrough to define said thin line of flux substantially perpendicular to said first axis.

18. A function generator as defined in claim 17 wherein said program member is a flat card of nonconductive material and wherein time is represented along said first axis and temperature is represented along said second axis.

19. A function generator as defined in claim 17 wherein said program member is in the form of a thin walled right circular cylinder and wherein said first axis corresponds to a circumference of said member.

References Cited

UNITED STATES PATENTS

| | | | |
|---|---|---|---|
| 2,617,587 | 11/1952 | Carpenter | 235—61 |
| 2,679,620 | 5/1954 | Berry | 323—51 X |
| 2,946,939 | 7/1960 | Lind | 318—31 |

JOHN F. COUCH, *Primary Examiner.*

W. E. RAY, *Assistant Examiner.*